US006385704B1

(12) United States Patent
Rao et al.

(10) Patent No.: US 6,385,704 B1
(45) **Date of Patent: *May 7, 2002**

(54) ACCESSING SHARED MEMORY USING TOKEN BIT HELD BY DEFAULT BY A SINGLE PROCESSOR

(75) Inventors: Raghunath Rao; Miroslav Dokic; Zheng Luo; Jeffrey Niehaus; James Divine, all of Austin, TX (US)

(73) Assignee: Cirrus Logic, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,884

(22) Filed: Nov. 14, 1997

(51) Int. Cl.$^7$ .......... G06F 12/00

(52) U.S. Cl. .......... 711/151; 711/152

(58) Field of Search .......... 711/150, 151, 711/152, 148, 147, 104

(56) References Cited

U.S. PATENT DOCUMENTS

| | | | | | |
|---|---|---|---|---|---|
| 5,671,393 | A | * | 9/1997 | Yamaki et al. | 711/150 |
| 5,845,322 | A | * | 12/1998 | Leung | 711/150 |
| 5,878,240 | A | * | 3/1999 | Tomko | 711/150 |
| 5,907,862 | A | * | 5/1999 | Smalley | 711/163 |

* cited by examiner

*Primary Examiner*—Reginald G. Bragdon
(74) *Attorney, Agent, or Firm*—James J. Murphy; Winstead Sechrest & Minick

(57) ABSTRACT

A method of operating shared memory in a multiple processor system. A token is by default maintained with a first processor, the token enabling access to shared memory. A determination is made that a second processor requires access to shared memory. A determination is also made as to whether the first processor is accessing to the shared memory. The token is transferred the second processor if the first processor is not accessing the shared memory. The second processor accesses the shared memory with the token.

11 Claims, 4 Drawing Sheets

ACCESSING SHARED MEMORY USING TOKEN BIT HELD BY DEFAULT BY A SINGLE PROCESSOR

CROSS-REFERENCE TO RELATED APPLICATION

The following co-pending and co-assigned application contains related information and is hereby incorporated by reference: Ser. No. 08/970,979, entitled DUAL PROCESSOR DIGITAL AUDIO DECODER WITH SHARED MEMORY DATA TRANSFER, AND SYSTEMS AND METHODS USING THE SAME; filed Nov. 14, 1997, now U.S. Pat. No. 6,081,783;

Ser. No. 08/970,794, entitled "METHODS FOR BOOTING A MULTIPROCESSOR SYSTEM, filed Nov. 14, 1997, now U.S. Pat. No. 6,012,142;

Ser. No. 08/970,372, entitled "METHODS FOR DEBUGGING A MULTIPROCESSOR SYSTEM, filed Nov. 14, 1997, now U.S. Pat. No. 6,101,598;

Ser. No. 08/969,883, entitled "INTER-PROCESSOR COMMUNICATION CIRCUITRY AND METHODS, filed Nov. 14, 1997, now U.S. Pat. No. 6,145,007;

Ser. No. 08/970,796, entitled "ZERO DETECTION CIRCUITRY AND METHODS, filed Nov. 14, 1997, now U.S. Pat. No. 5,978,825;

Ser. No. 08/970,841, U.S. Pat. No. 5,907,263 granted May 25, 1999; entitled "A BIAS CURRENT TUNING AND METHODS USING THE SAME; filed Nov. 14, 1997;

Ser. No. 08/971,080, entitled DUAL PROCESSOR AUDIO DECODER AND METHODS WITH SUSTAINED DATA PIPELINING DURING ERROR CONDITIONS, filed Nov. 14, 1997, now U.S. Pat. No. 6,009,389; and Ser. No. 08/970,302, U.S. Pat. No. 5,960,401 granted Sep. 28, 1999; entitled "METHODS FOR DEBUGGING A MULTIPROCESSOR SYSTEM, filed Nov. 14, 1997.

BACKGROUND OF THE INVENTION

1. Field of the Invention

The present invention relates in general to data processing and in particular, to methods for utilizing shared memory in a multiprocessor system.

2. Description of the Related Art

The ability to process audio information has become increasingly important in the personal computer (PC) environment. Among other things, audio support is important requirement for many multimedia applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability. Additionally, digital audio plays a significant role outside the traditional PC realm, such as in compact disk players, VCRs and televisions. As the audio technology progresses, digital applications are becoming increasingly sophisticated as improvements in sound quality and sound effects are sought.

One of the key components in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder must provide the proper hardware and software interfaces to communicate with the possible compressed (and decompressed) data sources, as well as the destination digital and/or audio devices. In addition, the decoder must have the proper interfaces required for overall control and debugging by a host microprocessor or microcontroller. Since, there are a number of different audio compression/decompression formats and interface definitions, such as Dolby AC-3 and S/PDIF (Sony/Phillips Digital Interface), a state of the art digital audio decoder should at least be capable of supporting multiple compression/decompression formats.

In almost any streaming data processing application, such as digital audio decompression, maintaining data throughput is essential. Often, the incoming data is organized in blocks, frames or similar data structures. Thus, in streaming data processing applications, efficient handling of structured data is many times crucial for high speed processing and consequently data throughput. A need therefore has arisen for methods of exchanging blocks or frames of data between processing blocks within a given device or system, such as an audio decoder, operating on streams of structured data.

SUMMARY OF THE INVENTION

According to the principles of the present invention, a method of operating shared memory in a multiple processor system is disclosed. A default token is maintained with a first processor, the token enabling access to shared memory. A determination is made that a second processor requires access to shared memory. A determination is also made as to whether the first processor is already accessing the shared memory. The token is transferred to the second processor if the first processor is not accessing to the shared memory the second processor.

The principles of the present invention allow at least two processor in a multiprocessor system to efficiently access shared memory. These principles can be utilized in many applications, and in particular to those applications where blocks of structured data are being processed. One exemplary application is in multiple processor audio decoders, where streams of data are received in blocks and frames which are subsequently accessed first by one processor the resulting blocks passed to the second processor for further processing.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIG. 1–5B of the drawings, in which like numbers designate like parts.

Figure 1A:
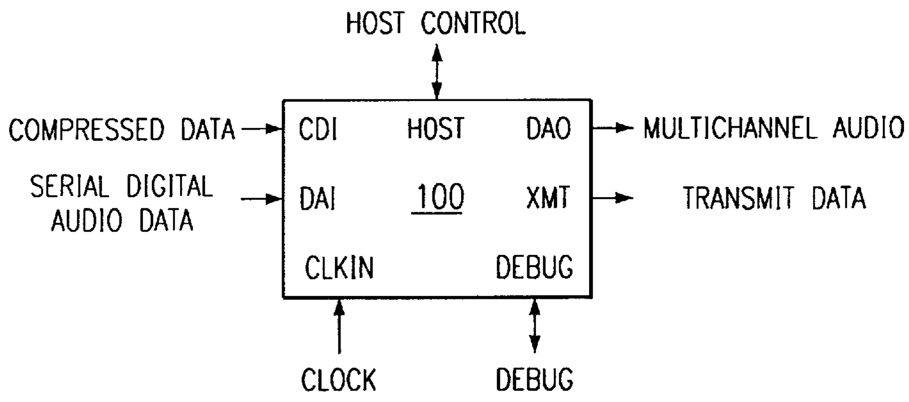
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input CDI port. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bits streams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each of 512 time samples, are multiplied by a time window and transformed into the frequency domain. Because the blocks of time samples overlap, each PCM input sample is represented by a two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encode each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC bit stream also includes additional information. For instance, each frame may include a frame header which indicates the bit rate, sample rate, number of encoded samples, and similar information necessary to subsequently synchronize and decode the AC-3 bit stream. Error detection codes may also inserted such that the processing device, such as decoder 100, can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the Advanced Televisions Systems Committee; incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
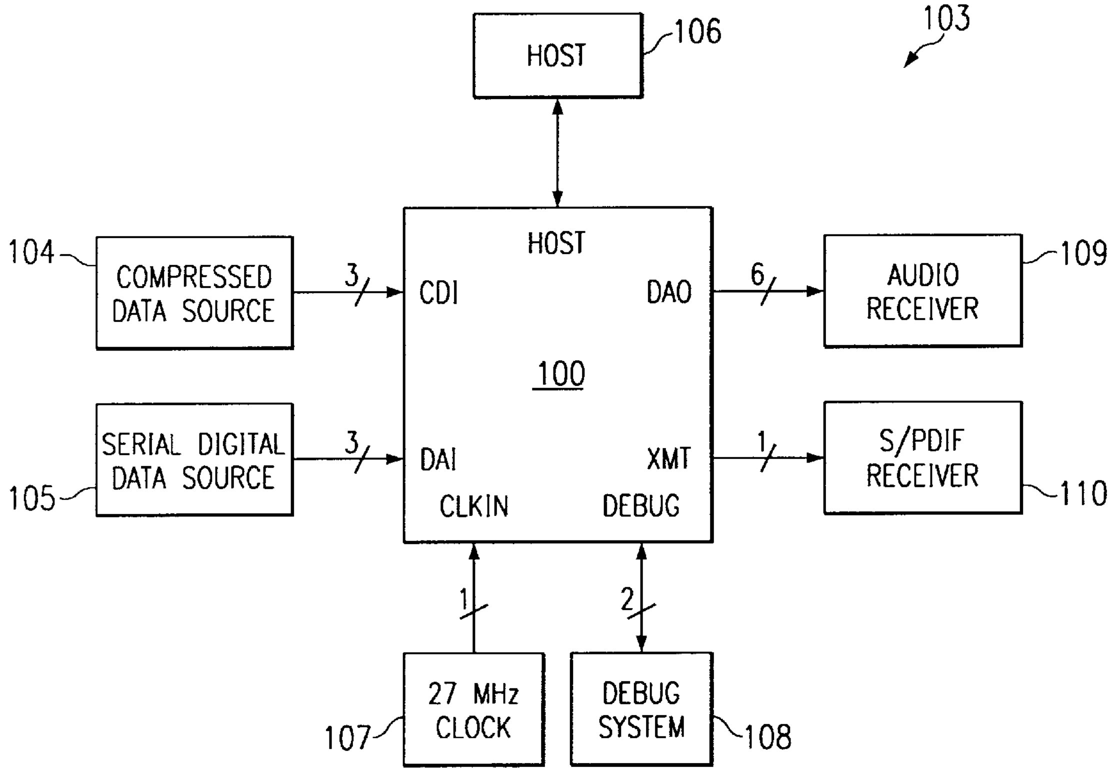
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio sources 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codes for transmission to analog receiver circuitry.

Figure 1C:
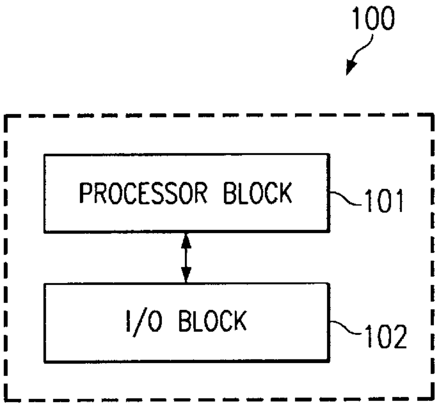
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and an I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
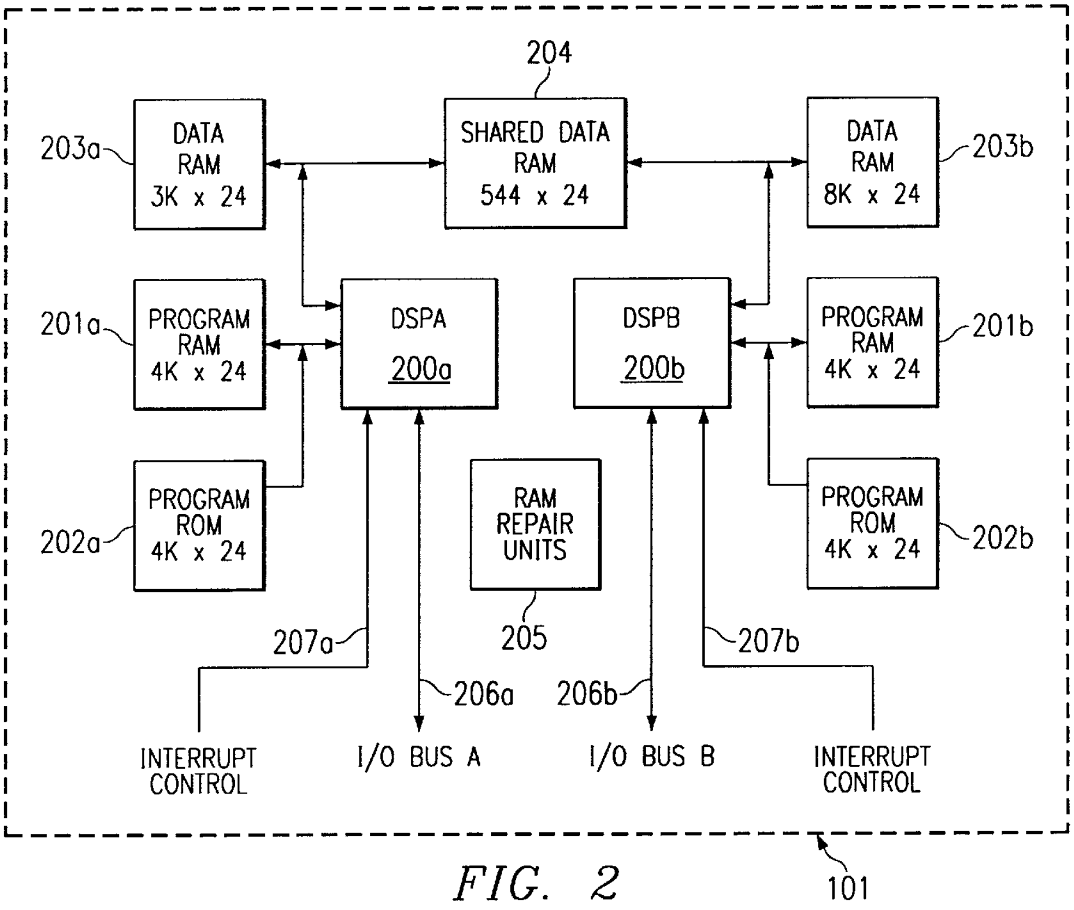
FIG. 2 is a diagram of the processor block of FIG. 1C.

FIG. 2 is a detailed functional block diagram of processor block 101. Processor block 101 includes two DSP cores

200*a* and 200*b*, labeled DSPA and DSPB respectively. Cores 200*a* and 200*b* operate in conjunction with respective dedicated program RAM 201*a* and 201*b*, program ROM 202*a* and 202*b*, and data RAM 203*a* and 203*b*. Shared data RAM 204, which the DSPs 200*a* and 200*b* can both access, provides for the exchange of data, such as PCM data and processing coefficients, between processors 200*a* and 200*b*. Processor block 101 also contains a RAM repair unit 205 that can repair a predetermined number of RAM locations within the on-chip RAM arrays to increase die yield.

DSP cores 200*a* and 200*b* respectively communicate with the peripherals through I/O Block 102 via their respective I/O buses 206*a*, 206*b*. The peripherals send interrupt and flag information back to the processor block via interrupt interfaces 207*a*, 207*b*.

DSP cores 200*a* and 200*b* are each based upon a time-multiplexed dual-bus architecture. As shown in FIG. 2, DSPs 200*a* and 200*b* are each associated with program and data RAM blocks 202 and 203. Data Memory 203 typically contains buffered audio data and intermediate processing results. Program Memory 201/202 (referring to Program RAM 201 and Program ROM 202 collectively) contains the program running at a particular time. Program Memory 201/202 is also typically used to store filter coefficients, as required by the respective DSP 200*a* and 200*b* during processing.

Figure 3:
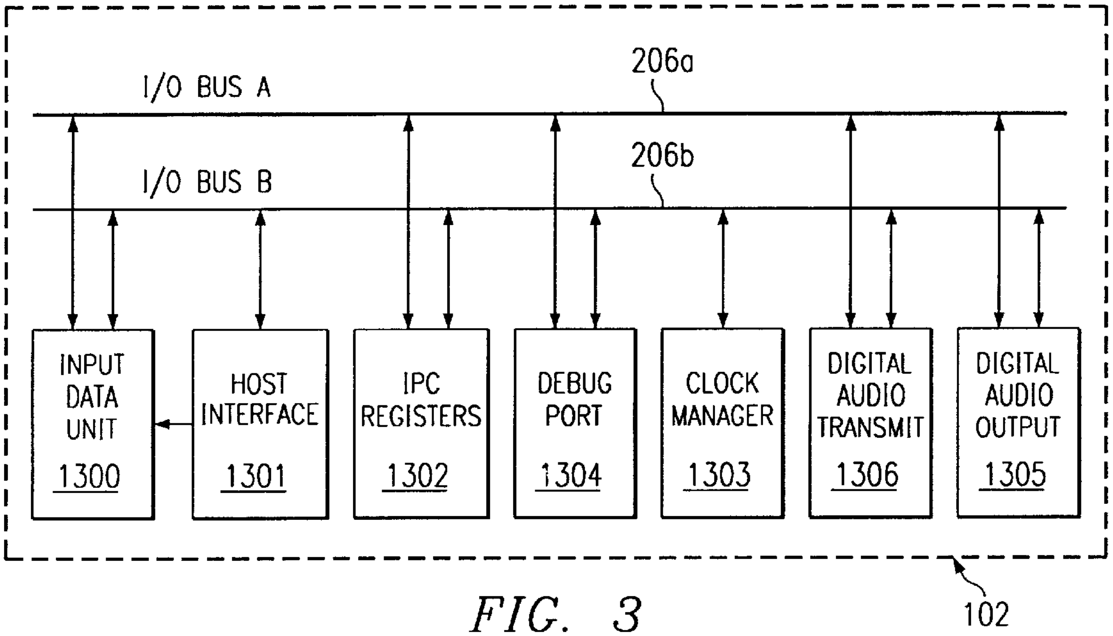
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time stamp information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200*a*)or DSPB (200*b*). Any read or write conflicts are resolved by treating DSPB as the master and ignoring DSPA.

Clock manager 1303 can be generally described as programmable PLL clock synthesizer that takes a selected input reference clock and produces all the internal clocks required to run DSPs 200 and audio peripherals. Control of clock manager 1303 is effectuated through a clock manager control register (cmctl). The reference clock can be selectively provided from an external oscillator, or recovered from selected input peripherals. The clock manager also includes a 33-bit STC counter, and a programmable timer which support playback synchronization and software task scheduling.

The principles of the present invention further allow for methods of decoding compressed audio data, as well as for methods and software for operating decoder 100. Initially, a brief discussion of the theory of operation of decoder 100 will be undertaken.

The Host can choose between serial and parallel boot modes during the reset sequence. The Host interface mode and autobit mode status bits, available to DSPB 200*b* in the HOSTCTL register MODE field, control the boot mode selection. Since the host or an external host ROM always communicates through DSPB, DSPA 200*a* receives code from DSPB 200*b* in the same fashion, regardless of the host mode selected.

In a dual-processor environment like decoder 100, it is important to partition the software application optimally between the two processors 200*a*, 200*b* to maximize processor usage and minimize inter-processor communication. For this the dependencies and scheduling of the tasks of each processor must be analyzed. The algorithm must be partitioned such that one processor does not unduly wait for the other and later be forced to catch up with pending tasks. For example, in most audio decompression tasks, including Dolby AC-3, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in-the DSP, each stage of processing (multiply+accumulate) will introduce noise due to elimination of the lesser significant bits. Adding features such as rounding and wider intermediate storage registers can alleviate the situation.

For example, Dolby AC-3 requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/− 0.5 dB from 3 Hz to 20 kHz.

In a complex real-time system (embedded or otherwise) each sub-system has to perform its task correctly, at the right time and cohesively with all other sub-systems for the overall system to work successfully. While each individual sub-system can be tested and made to work correctly, first attempts at integration most often result in system failure. This is particularly true of hardware/software integration. While the new design methodology, according to the principals of the present invention, can considerably reduce hardware/software integration problems, a good debug strategy incorporated at the design phase can further accelerate system integration and application development. A major requirement of the debug strategy that it should be simple and reliable for it to be confidently used as a diagnostic tool.

Debuggers can be of two kinds: static or dynamic. Static debugging involves halting the system and altering/viewing the states of the various sub-systems via their control/status registers. This offers a lot of valuable information especially if the system can automatically "freeze" on a breakpoint or other trapped event that the user can pre-specify. However, since the system has been altered from its run-time state, some of the debug actions/measurements could be irrelevant, e.g. timer/counter values.

Dynamic debugging allows one to do all the above while the system is actually running the application. For example, one can trace state variables over time just like a signal on an oscilloscope. This is very useful in analyzing real-time behavior. Alternatively, one could poll for a certain state in the system and then take suitable predetermined action.

Both types of debugging require special hardware with visibility to all the sub-systems of interest. For example, in a DSP-based system-on-a-chip such as decoder 100, the debug hardware would need access to all the sub-systems connected to the DSP core, and even visibility into the DSP core. Furthermore, dynamic debugging is more complex than its static counterpart since one has to consider problems of the debug hardware contending with the running sub-systems. Unlike a static debug session, one cannot hold off all the system hardware during a debug session since the system is active. Typically, this requires dual-port access to all the targeted sub-systems.

While the problems of dynamic debugging can be solved with complicated hardware there is a simpler solution which is just as effective while generating only minimal additional processor overhead. Assuming that there is a single processor (like a DSP core 200*a* or 200*b*), in the system with access to all the control/state variables of interest, a simple interrupt-based debug communication interface can be built for this processor. The implementation could simply be an additional communication interface to the DSP core. For example, this interface could be 2-wire clock+data interface where a debugger can signal read/write requests with rising/falling edges on the data line while holding the clock line high, and debug port sends back an active low acknowledge on the same data line after the subsequent falling edge of the clock.

A debug session involves read/write messages sent from an external PC (debugger) to the processor via this simple debug interface. Assuming multiple-word messages in each debug session, the processor accumulates each word of the message by taking short interrupts from the main task and reading from the debug interface. Appropriate backup and restore of main task context are implemented to maintain transparency of the debug interrupt. Only when the processor 200*a*, 200*b* accumulates the entire message (end of message determined by a suitable protocol) is the message serviced. In case of a write message from the PC, the processor writes the specified control variable(s) with specified data.

In case of a read request from the PC, the processor compiles the requested information into a response message, writes the first of these words into the debug interface and simply returns to its main task. The PC then pulls out the response message words via the same mechanism—each read by the PC causes an interrupt to the processor which reloads the debug interface with the next response word till the whole response message is received by the PC.

Such a dynamic debugger can easily operate in static mode by implementing a special control message from the PC to the processor to slave itself to the debug task until instructed to resume the application.

When there are more than one processor in the system the conventional debug strategy discussed above advantageously can be used in multiprocessor systems such as decoder 100, since there is already provision for dual port access to all the sub-systems of interest. However, to use the above simplified strategy in a dual-DSP system like decoder 100 requires changes.

Each processor in such a system will usually have dedicated resources (memory, internal registers etc.) and some shared resources (data input/output, inter-processor communication, etc.). A dedicated debug interface for each processor is also possible, but is avoided since it is more expensive, requires more connections, and increases the communication burden on the PC. Instead, the preferred method is using a shared debug interface through which the PC user can explicitly specify which processor is being targeted in the current debug session via appropriate syntax in the first word of the messaging protocol. On receiving this first word from the PC, the debug interface initiates communication only with the specified processor by sending it an initial interrupt. Once the targeted processor receives this interrupt it reads out the first word, and assumes control of the debug interface (by setting a control bit) and directs all subsequent interrupts to itself. This effectively holds off the other processor(s) for the duration of the current debug session. Once the targeted processor has received all the words in the debug message, it services the message. In case of a write message, it writes the specified control variable(s) with the specified data and then relinquishes control of the debug interface so that the PC can target any desired processor for the next debug session.

In case of a read request, the corresponding read response has to make its way back from the processor to the PC before the next debug session can be initiated. The targeted processor prepares the requested response message, places the first word in the debug interface and then returns to its main task. Once the PC pulls this word out, the processor receives an interrupt to place the next word. Only after the complete response message has been pulled out does the processor relinquish the debug interface so that the PC can start the next debug session with any desired processor.

Since there are multiple processors involved, this scheme advantageously effectively prohibits unsolicited transactions from a processor to the PC debugger. This constraint precludes many contention issues that would otherwise have to be resolved.

Since the PC debugger can communicate with every processor in the system, the scope of control and visibility of the PC debugger includes every sub-system that can be accessed by the individual processors. This is usually quite sufficient for even advanced debugging.

Whether static or dynamic, all the functions of a debugger can be viewed as reading state variables or setting control variables. However, traps and breakpoints are worthy of special discussion.

During a debug session, when the PC user desires to setup a breakpoint at a particular location in the program of the processor, it has to backup the actual instruction at that location and replace it with a trap instruction. The trap is a special instruction designed such that the processor takes a dedicated high priority interrupt when it executes this instruction. It basically allows a pre-planned interruption of the current task.

In the single-processor strategy, when the processor hits a trap it takes an interrupt from the main task, sends back an unsolicited message to the PC, and then dedicates itself to process further debug messages from the PC (switches to static mode). For example the PC could update the screen with all the system variables and await further user input. When the user issues a continue command, the PC first replaces the trap instruction with the backed-up (original) instruction and then allows the processor to revert to the main task (switches to dynamic mode).

In the multi-processor debug strategy, unsolicited messages from a processor to the PC are prohibited in order to resolve hardware contention problems. In such a case, the breakpoint strategy needs to be modified. Here, when a processor hits a trap instruction, it takes the interrupt from its main task, sets a predetermined state variable (for example, Breakpoint_Flag), and then dedicates itself to process further debug messages from the PC (switches to static mode). Having setup this breakpoint in the first place, the PC should be regularly polling the Breakpoint_Flag state variable on this processor—although at reasonable intervals so as not to waste processor bandwidth. As soon as it detects Breakpoint_Flag to be set, the PC issues a debug message to clear this state variable to setup for the next breakpoint. Then, the PC proceeds just as in the single-processor case.

All other program flow debug functions, such as step into, step over, step out of, run to cursor etc. are implemented from the PC by appropriately placing breakpoints and allowing the processor to continue and execute the desired program region.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that it can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of the same complexity, there will be no waiting on either DSP side.

Figure 4:
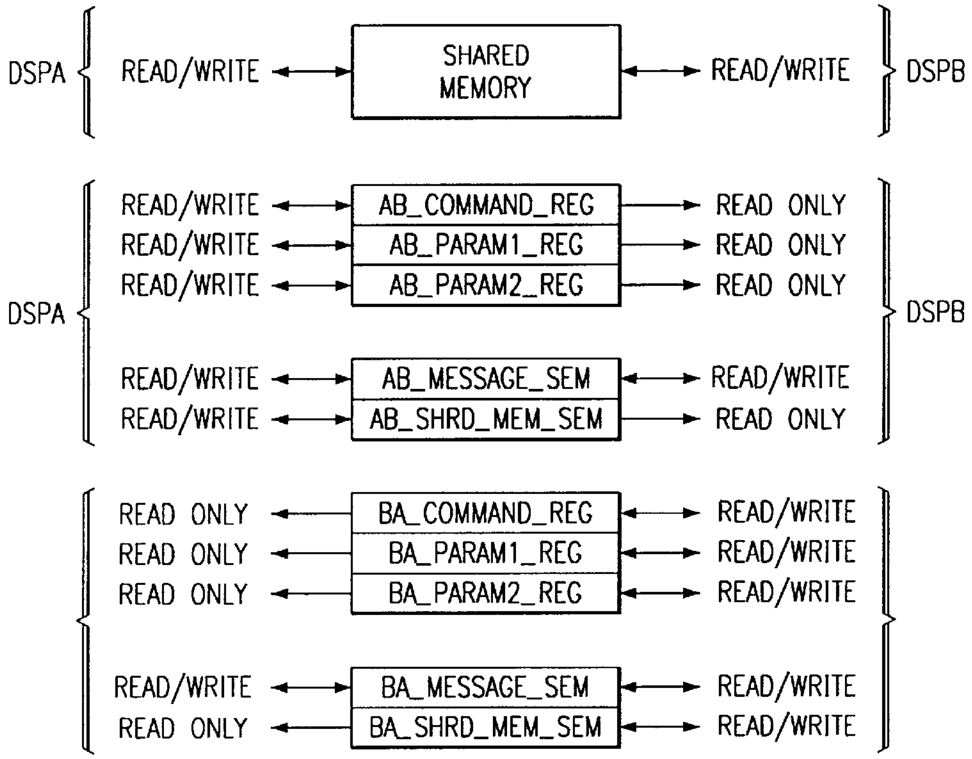
FIG. 4 is a diagram representing the shared memory space and IPC registers (1302)

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this (a) AB_command_register (DSPA write/read, DSPB read only)

(b) AB_parameter1_register (DSPA write/read, DSPB read only)

(c) AB_parameter2_register (DSPA write/read, DSPB read only)

(d) AB_message_semaphores (DSPA write/read, DSPB write/read as well)

(e) AB_shared_memory_semaphores (DSPA write/read, DSP B read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200*a*, 200*b* can write to or read from shared memory 204. However, software management provides that the two DSPs never write to or read from shared memory in the same clock cycle. It is possible, however, that one DSP writes and the other reads from shared memory at the same time, given a two-phase clock in the DSP core. In, this way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory_semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_sempahore register which can be written by both DSPs. Full symmetry in communication is provided even though for most applications the data flow is from DSPA to DSPB. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. The DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading the flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory_semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending a message that it took the data from shared memory and DSPA is setting shared memory flags to zero in its interrupt handler. This way full synchronization is achieved and no access violations performed.

When designing a real time embedded system both hardware and software designers are faced with several important trade-off decisions. For a given application a careful balance must be mainframe between memory utilization and the usage of available processing bandwidth. For most applications there exist a very strong relationship between the two: memory can be saved by using more MIPS or MIPS could be saved by using more memory. Obviously, the trade-off exists within certain boundaries, where a minimum amount of memory is mandatory and a minimum amount of processing bandwidth is mandatory.

An example of such trade-off in the AC-3 decompression process is decoding of the exponents for the sub-band transform coefficients. The exponents must arrive in the first block of an AC-3 frame and may or may not arrive for the subsequent blocks, depending on the reuse flags. But also, within the block itself, 6 channels are multiplexed and the exponents arrive in the bitstream compressed (block coded) for all six channels, before any mantissas of any channel are received. The decompression of exponents has to happen for the bit allocation process as well as scaling of mantissas. However, once decompressed, the exponents might be reused for subsequent blocks. Obviously, in this case they would be kept in a separate array (256 elements for 6 channels amounts to 1536 memory locations). On the other hand, if the exponents are kept in compressed form (it takes only 512 memory locations) recomputation would be required for the subsequent block even if the reuse flag is set. In decoder 100 the second approach has been adopted for two reasons: memory savings (in this case exactly 1 k words) and the fact that in the worst case scenario it is necessary to recompute the exponents anyway.

The proper input FIFO is important not only for the correct operation of the DSP chip itself, but it can simplify the overall system in which decoder 100 resides. For example, in a set-top box, where AC-3 audio is multiplexed in the MPEG2 transport stream, the minimum buffering requirement (per the MPEG spec infecation) is 4 kbytes. Given the 8 kbyte input FIFO in decoder 100 (divisible arbitrarily in two, with minimum resolution of 512 bytes), any audio bursts from the correctly multiplexed MPEG2 transport stream can be accepted, meaning that no extra buffering is required upstream in the associated demux chip. In other words, its demun chips will simply pass any audio data directly to the codec 100, regardless of the transport bit rate, thereby reducing overall system cost.

Also, a significant amount of MIPS can be saved in the output FIFOs, which act as a DMA engine, feeding data to the external DACs. In case there are no output FIFOs the DSP has to be interrupted at the Fs rate (sampling frequency rate). Every interrupt has some amount of overhead associated with switching the context, setting up the pointers, etc. In the case of the codec 100, a 32, sample output is provided FIFO with half-empty interrupt signal to the DSP, meaning that the DSP is now interrupted at Fs/16 rate. Subsequently, any interrupt overhead is reduced by a factor of 16 as well, which can result in 2–3 MIPS of savings.

In the dual DSP architecture of decoder 100 the amount of shared memory is critical. Since this memory is essentially dual ported resulting in much larger memory cells and occupying much more die area, it is very critical to size it properly. Since decoder 100 has two input data ports, and the input FIFO is divisible to receive data simultaneously from the two ports, the shared memory was also designed to handle two data channels. Since the size of one channel of one block of AC-3 data is 256 transform coefficients a 256 element array has been allocated. That is, 256 PCM samples can be transferred at the same time while transferring AC-3 transform coefficients. However, to keep two DSP cores 200*a* and 200*b* in sync and in the same context, an additional 32 memory locations are provided to send a context descriptor with each channel from DSPA to DSPB. This results in the total shared memory size of 544 elements, which is sufficient not only for AC-3 decompression implementation but also for MPEG 5.1 channel decompression as well as DTS audio decompression.

The PCM buffer size is another critical element since all 6 channels are decompressed. Given the AC-3 encoding scheme (overlap and add), theoretically a minimum of 512 PCM data buffer is required. However, given a finite decoder latency, another buffer of 256 samples for each channel is required so that a ping-pong strategy can be employed. While one set of 256 samples is being processed, another set of 256 is being decoded. A decode process must be completed before all samples in PCM buffer are played, but given a MIPS budget this is always true. So, no underflow conditions should occur.

A more detailed description of the system software and firmware can now be provided. Decoder 100 supports two boot loader programs, one residing in each ROM 202 associated with each of the two DSP cores 200. DSPB (200*b*) acts as a main interface to the Host, as in runtime, accepting application code for both DSPs 200, loading its own program or data memory 202*b*/203*b*, and in addition, transferring the application code for DSPA to the boot loader residing in DSPA (200*a*), which in turn loads its program memory 202*a* and data memory 203*a*.

The Host interface mode bits and autoboot mode status bit are available to DSPB in the HOSTCTL register [23:20] (MODE field). Data always appears in the HOSTDATA register one byte at a time. The only difference in DSPB boot loader code for different modes, is the procedure of getting a byte from the HOSTDATA register. Once the byte is there, either from the serial or parallel interface or from an external memory in autoboot mode, the rest of DSPB boot loader code is identical for all modes. Upon determining the mode from the MODE bits, DSPB re-encodes the mode in the DBPST register in the following way: 0 is for autoboot, 1 for Serial Mode, and 2 for Parallel Mode. This more efficient encoding of the mode is needed, since it is being invoked every time in the procedure Get__Byte__From__Host. During application run-time, the code does not need to know what the Host interface mode is, since it is interrupt-driven and the incoming or outgoing byte is always in the HOSTDATA register. However, during the boot procedure, a polling strategy is adopted and for different modes different status bits are used. Specifically, HIN-BSY and HOUTRDY bits in the HOSTCTL register are used in the parallel mode, and IRDY and ORDY bits from SCPCN register are used in the serial mode.

Each DSP 200*a*, 200*b* has an independent reset bit in its own CONTROL register (CR) and can toggle its own reset bit after successful boot procedure. DSPA soft reset will reset only DSPA core and will not alter DSPA's MAPCTL, PMAP, and DMAP memory repair registers. DSPB soft reset will reset DSPB core as well as all I/O peripherals, but will not alter DSPB's MAPCTL, PMAP, and DMAP memory repair registers. Synchronized start is not an issue since the downloaded application code on each DSP handles synchronization.

Three major subroutines are described here. The first one is Get__Byte__From__Host, which is mode-sensitive (checking is done on the encoded value in DBPTMP register). The byte is returned in the AR6 register.

The second subroutine is Send__Byte__To__Host, which takes the byte in AR6 and sends it to the Host. This routine is not mode-sensitive, since when a byte is to be sent to the Host, the previous byte has already been picked up. This is true since messages returning to the Host are only byte-wide and only of two kinds, solicited or unsolicited.

Solicited
BOOT__START
DSPA/DSPB__MEMORY__FAILURE
BOOT__SUCCESS
BOOT__ERROR__CHECKSUM (in which case the Host is waiting for the response)
Unsolicited
BOOT__ERROR__ECHO
BOOT__ERROR__TIMEOUT (in which case the Host is sending or waiting to send image data and therefore has no pending byte to read).

In either case, DSPB can safely send out a byte without checking whether the resource is busy.

The third important subroutine is Get__Word__From__Host. This subroutine returns one 24 bit word in the COM__BA register after regesters and AR6 as and temporary storage. Actually, Get__Byte__From__Host is invoked three times within Get__Word__From__Host and the incoming byte in AR6 is shifted appropriately in ACC0. The Get__Word__From__Host subroutine also updates the checksum by using ADD instead Of XOR. The running checksum is kept in register PAR__2__BA. Note that there is no Send__Word__To__Host subroutine, since all replies to the Host are a full byte wide.

Figure 5A:
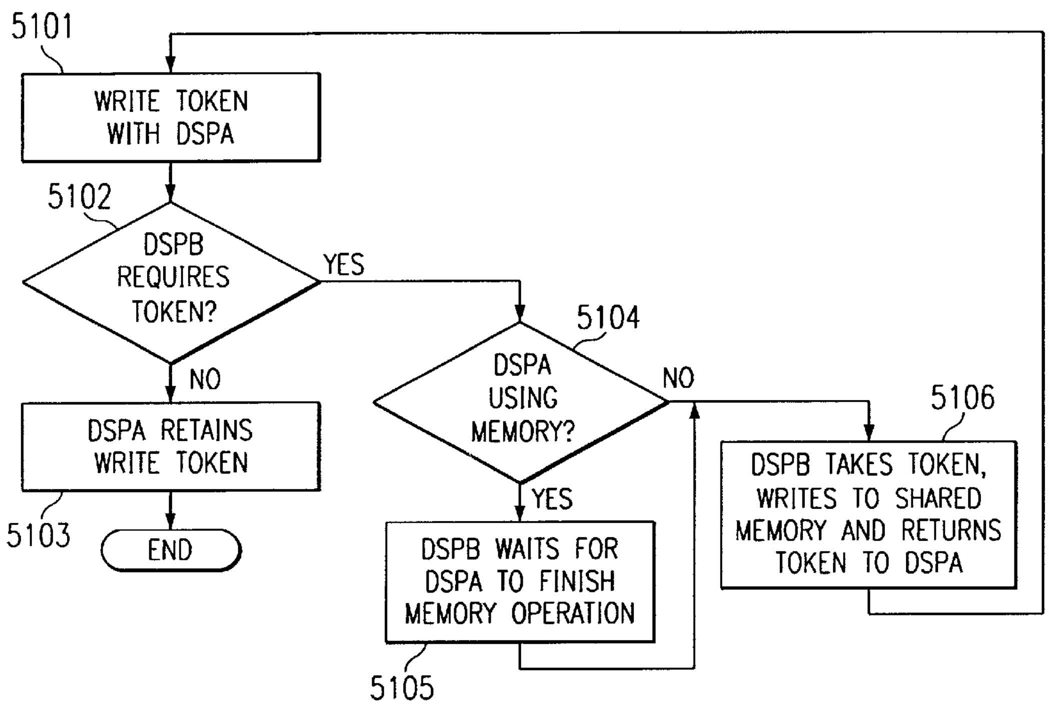
FIG. 5A is a flow diagram of an exemplary write sequence to shared memory.

FIG. 5A is a flow diagram of an exemplary write to shared memory by DSPB, assuming that the token is with DSPA initially at Step 5101. In case of write access, only the processor that has the token can proceed with the write operation. DSPB, as the master, controls the ownership of the token. DSPA has the token as the default (Step 5103), but it does not control the token's ownership. This is because most of the time the data-flow through shared memory is from DSPA to DSPB (e.g., a set of transform coefficients plus a descriptor is written by DSPA and read by DSPB). DSPB takes the token from DSPA only when it needs it (Step 5102). As soon as DSPB is finished with its write, it passes the token back to DSPA (Step 5106). If DSPA is using memory at the moment when DSPB wants to take the token back (Step 5104), DSPB must wait for DSPA to complete the current access (Step 5105). The arrangement is designed to ensure that there are no incomplete accesses. In order to fully implement this process another variable is introduced that indicates whether DSPA is actually using shared memory when it does have the token. That is, DSPA can possess the token but may or may not be actively accessing the shared memory at the time that DSPB wants it.

In the pseudo-code that controls the access to shared memory, variable WR__PRIVILEGE__A plays the role of write token. When WR__PRIVILEGE__A=1, DSPA has the token. When WR__PRIVILEGE__A=0, DSPB has the token. WR__PRIVILEGE__A can be read by both DSPA and DSPB, but it can be written only by DSPB. The second variable, WR__USE__A, indicates whether DSPA is really using shared memory or not. When DSPA has the token (WR__PRIVILEGE__A=1) and WR__USE__A=1, then DSPA is writing to shared memory, When WR__PRIVILEGE__A=1 and WR__USE__A=0, DSPA has the token but is not accessing the shared memory. When WR__PRIVILEGE__A=0, DSPB has the token and it is assumed that it is using the shared memory, since DSPB is designed to pass the token back to DSPA when DSPB's memory access is complete. The table below summarizes the possible states regarding shared memory access.

TABLE 1

Shared Memory Access Variables

| WR__PRIVILEGE__A | WR__USE__A | Description |
|---|---|---|
| 1 | 0 | DSPA has the token but it is not accessing the shared memory |
| 1 | 1 | DSPA has the token and it is accessing the shared memory |
| 0 | 0 | DSPB has the token but it is not accessing the shared memory |
| 0 | 1 | Illegal state (not allowed), since this condition indicates that DSPA does not have the token and is accessing the shared memory |

The two variables, WR__PRIVILEGE__A and WR__USE__A, actually reside in two separate I/O registers that are visible to both DSPs. They act as semaphore variables that control physical access to the shared memory. These two I/O registers are in addition to the existing IPC register file that consists of eight registers (and will be detailed later in this document). Also, these two I/O registers do not need to be twenty-four bits in length; eight bits are sufficient. It is important to note that the nature of the access to these two I/O registers is such that DSPB will never write to the register that contains WR__USE__A and DSPA will never write to the register that contains WR__PRIVILEGE__A. Rather, they will only read from those registers, respectively.

Emplary code that DSPA has to execute before it can write to shared memory is:

Wait__1: and AIR__PRIVILEGE__A, 1, Junk (test whether write token is available)
- jmpwait__1, EQ
- DISABLE INTERRUPTS
- mvp1, WR__USE__A (token available, try to use shared memory)
- nop (extra instruction needed for sync-ing)
- nop and WR__PRIVILEGE__A, 1, Junk (check again whether token is still in possession)
- jmp Continue__1, NE
- ENABLE INTERRUPTS
- mvp0, WR__USE__A (unsuccessful attempt, almost got it)
- jmpWait__1 (go back and wait for the resource)

Continue__1:ENABLE INTERRUPTS
- {token obtained and the access to shared memory is safe}
- {after some event like interrupt from DSPB or similar decoding event}
- {reset WR__USE__A to zero so that DSPB can take the token if it wants to}
- mvp0, WR__USE__A On the other hand, if DSPB needs the shared memory, it will attempt to get the token from DSPA. The piece of code that it runs looks like this:

Wait__3: ENABLE INTERRUPTS

Wait__2: and WR__USE__A, 1, ACC
- jmpwait__2, NE (DSPA is using shared memory so wait)
- DISABLE INTERRUPTS
- xorWR__USE__A, ACC, Junk (check again if the value is consistent)
- jmpWait__3, NE (almost got it, but unsuccessful)
- mvp0, WR__PRIVILEGE__A (take the token back)
- ENABLE INTERRUPTS
- {access the shared memory}
- mvp1, WR__PRIVILEGE__A (return the token to DSPA)

To summarize, writes to shared memory only DSPB can write the variable WR__PRIVILEGE__A and only DSPA can write the variable WR__USE__A. Both DSPs can read either variable at any time. A potential problem can arise when DSPA is setting the WR__USE__A and DSPB is reading it at the same time. If this happens in exactly the same instruction cycle, it will be resolved by introducing a two-instruction delay and check for the WR__PRIVILEGE__A again on DSPA side. Also DSPB reads the value of WR__USE__A twice to ensure that the value is valid before taking away the token from DSPA. It is important to note that this critical piece of code must not be interrupted, otherwise the timing of execution is corrupted and the communication would not be reliable.

A very similar concept is introduced for read accesses where RD__PRIVILEGE__B and RD__USE__B variables are used.

Figure 5B:
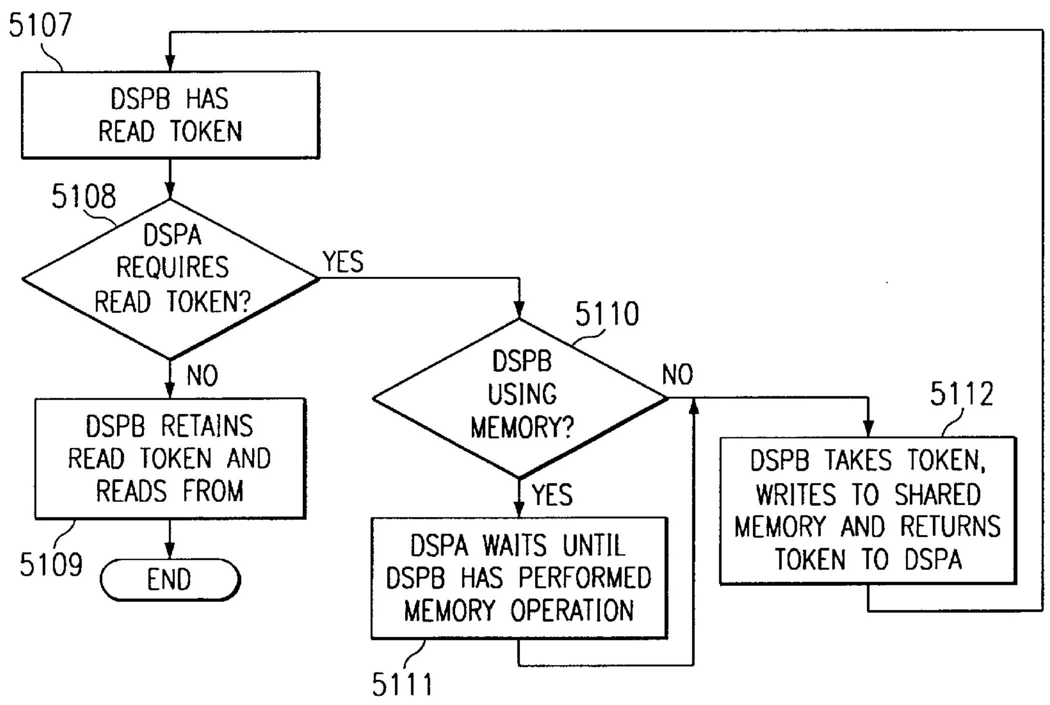
FIG. 5B is a flow chart of a typical read sequence to shared memory.

FIG. 5B is a flow chart of a typical read sequence to shared memory by DSPA. Steps 5107–5112 are analogous to the steps shown in FIG. 5B. In this case the roles of DSPA and DSPB are reversed and it is DSPA that controls the ownership of the read token, but by default it is DSPB that really owns the token. In case that DSPA needs a read token it will take it away from DSPB, just like DSPB was taking away the write token. This concept is important since most of the time it is DSPA that writes to shared memory and it is DSPB that reads from shared memory. So, DSPB needs to write to shared memory on exception basis, just like DSPA needs to read from shared memory on the exception basis. In order to minimize the overhead of switching the token ownership the roles of DSPA and DSPB are as described above. Note, that while DSPB is generally a master in the system, in case of read token it is DSPA that is the master. This is the only exception to the master-Slave concept, where DSP is always the master. DSPB could be the master in this case as well, however, every read access from shared memory by DSPB will suffer from unnecessary overhead of taking away the read token from DSPA.

It is important to emphasize the fact that read and write tokens along with RD/WR USE variables simply control the physical access to the shared resources.

In sum, the principles of the present invention allow for the construction, operation and use of a multiple processor device or system. In particular, these principles can advantageously applied to devices or sysetms where blocks or frames of data must be continuously exchanged.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of operating shared memory in a multiple processor system comprising the steps of:

maintaining by default a token with a first processor by writing a token bit in a first register with a second processor, the token enabling access to shared memory;

clearing a flag bit in a second register with the first processor to indicate that the first processor has completed access of the shared memory;

determining that the second processor requires access to the shared memory;

determining that the first processor has completed access of the shared memory by reading the cleared flag bit in the second register with the second processor;

transferring the token to the second processor by rewriting the token bit in the first register with the second processor;

accessing the shared memory with the second processor; and returning the token from the second processor to the first processor after said step of accessing the shared memory with the second processor by rewriting the token bit in the first register with the second processor.

2. The method of claim 1 wherein the first and second processors comprise digital signal processors.

3. The method of claim 1 wherein the first and second processors form a part of an audio decoder.

4. The method of claim 1 wherein the shared memory comprises random access memory.

5. The method of claim 1 wherein the token comprises a write token for enabling write accesses to the shared memory.

6. The method of claim 1 wherein the token comprises a read token for enabling read accesses to the shared memory.

7. A multiple processor system comprising:

first and second digital signal processors;

a shared memory for exchanging data between said first and second processors;

a first register for storing a token represented by a token bit readable by said first processor and writeable by said second processor, said token controlling access to said shared memory and held by said first processor in default; and a second register for storing a flag bit indicating whether said first digital signal processor is accessing said shared memory, said flag bit in said second register writeable by said first processor and readable by said second processor, said second processor operable to write to said token bit in said first register to transfer said token to said second processor in response to a state of said flag bit in said second register indicating that the first processor has completed accessing said shared memory and to rewrite said token bit to return the token to the first processor in default after access to said shared memory by said second processor.

8. The processing device of claim 7 wherein said first and second digital signal processors are fabricated on a single chip.

9. The processing device of claim 7 wherein said first and second digital signal processors are operable to process digital audio data.

10. The processing device of claim 7 wherein said token comprises a write token and said access comprises a write to said shared memory.

11. The processing device of claim 7 wherein said token comprises a read token and said access comprises a read from said shared memory.

* * * * *